D. L. LINDQUIST.
GRID RESISTANCE.
APPLICATION FILED JAN. 21, 1913.
1,162,788.
Patented Dec. 7, 1915.
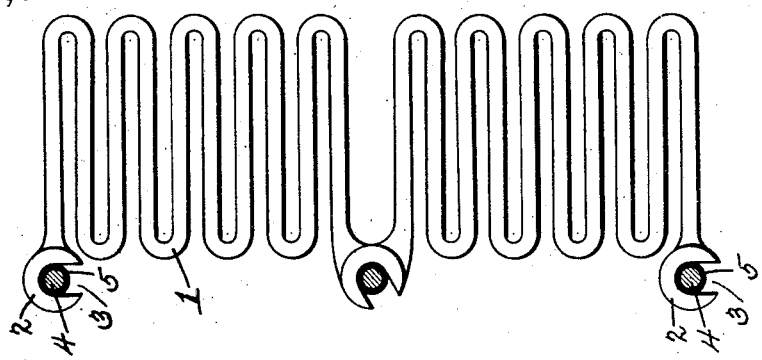
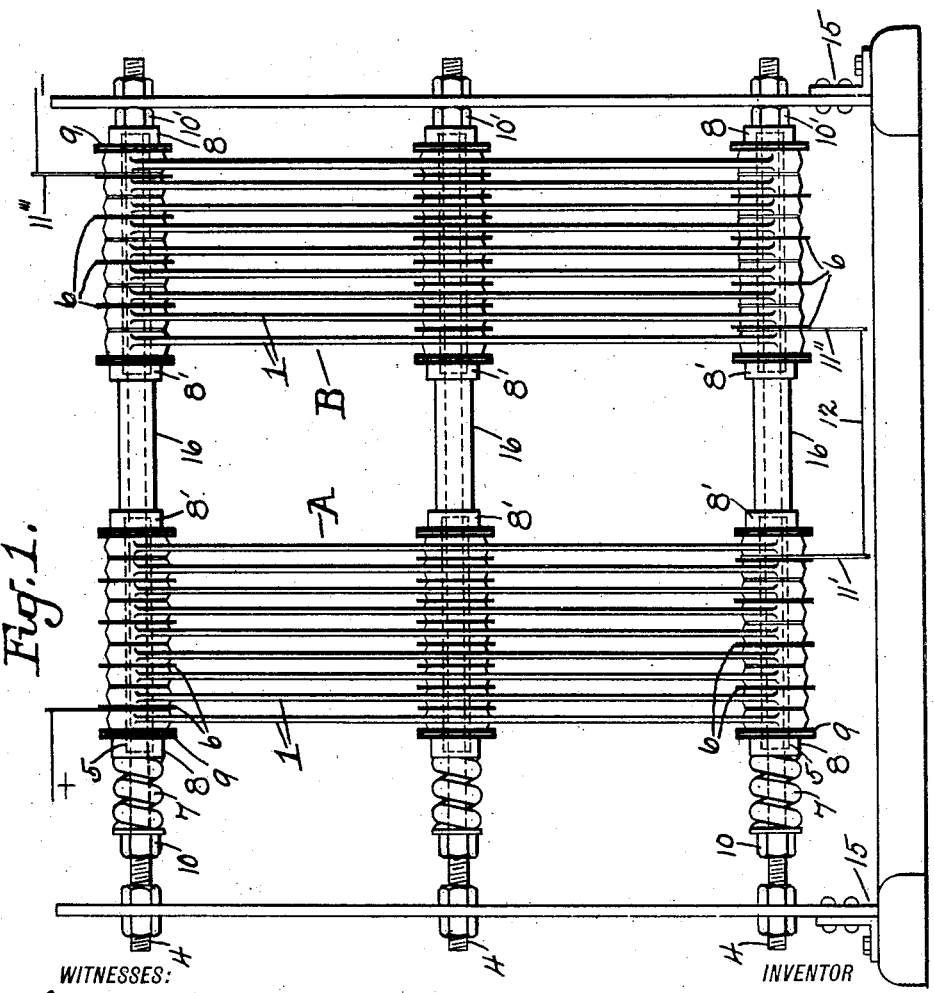
WITNESSES:
Ernest L. Gale, Jr.
James G. Bethell.
INVENTOR
David L. Lindquist
BY
J. H. Campbell
ATTORNEY

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

GRID RESISTANCE.

1,162,788.  Specification of Letters Patent.  Patented Dec. 7, 1915.

Application filed January 21, 1913. Serial No. 743,254.

*To all whom it may concern:*

Be it known that I, DAVID L. LINDQUIST, a subject of the King of Sweden, residing in Yonkers, in the county of Westchester and State of New York, have invented a new and useful Improvement in Grid Resistances, of which the following is a specification.

My invention relates to improvements in grid resistances, and has for its object to provide a resilient means for maintaining grid resistances in yielding electrical engagement with each other.

Another object of my invention is to provide a resilient means to allow for expansion of the grids on their supporting members, and thereby eliminate the tendency of the grids to injure or break its supporting members or fastenings.

Grids of the type herein shown are used extensively, and great difficulty has been experienced by the buckling of the supporting members, and the stripping of the threads on the nuts, which as heretofore has been the practice, have been screwed tightly against the grids to keep them into firm electrical engagement with each other. When carrying an electric current the grids heat up and expand, and on account of being screwed tightly together, will cause the rods to buckle or lengthen beyond their elastic limit. The buckling of the rods will cause the grids to bend and touch each other, and quite often to such extent as to cause the grids to break, the grids being fragile. In case the threads on the nuts become stripped, it allows the grids to separate and thereby opens the electrical circuit formed by the grids, which is a very bad feature.

The greatest difficulty has been experienced in keeping the grids in firm electrical engagement with each other, when the grids contact. The grids are constructed and arranged on their supporting frame to form an electric circuit, but when the grids contract the grids become disengaged, and thereby cause a break in the electric circuit, but with the application of my resilient members, the grids may expand without causing injury to any of its supporting members, and when they contract, they will be kept in firm electrical engagement with each other.

Referring now to the drawings, Figure 1, is a front elevational view, showing an arrangement of grid resistances with my invention applied thereto; Fig. 2, is a sectional view of Fig. 1.

The grids, 1, are of a zig-zag shape, and have lugs, 2, formed thereon. The lugs are provided with slots 3, whereby the grids may be put on or taken off supporting rods 4. The grids are insulated from the supporting rods by micanite tubes 5. The tubes set into clamp washers, 8, which are insulated from the grids by the insulating washers, 9. The faces on the lugs of the grids are formed to engage each other at points, whereby the grids form a continuous electrical circuit, but in order to do this, insulating washers, 6, are interposed between the faces at certain points, to prevent the grids being short circuited.

As before stated it is of great importance to have resilient means which will allow the grids to expand and, which will keep them in firm electrical contact when they contract, and to this end, I provide stiff coil springs, 7. These springs are carried on each of the rods 4, and are adjustable by the nuts 10. Nuts 10' at the other end of the rods hold the grids against the action of the springs.

The grids are divided into sections, A and B, being so arranged to eliminate the strain on the supporting rods, which there would be if the grids were assembled in one section. Pipes, 16, are interposed between the sections, A and B of the grid resistances, and bear against clamp washers 8', and serve to separate the said resistance sections, and still to maintain the effectiveness of the springs to the sections to allow for expansion of the same, the section B being held by the nuts 10', against the action of the said springs.

Terminals, 11, may be connected at any desired point in the grid resistance, but as herein shown, the sections, A and B, are connected in series, the circuit therethrough being as follows; from the conductor marked, +, the terminal, 11, section, A, of the grid resistance, terminal, 11', conductor, 12, terminal, 11'', section, B, of the grid resistance, terminal, 11''', to conductor marked, —. It will thus be seen that the grids form a complete electric circuit, and with the application of my resilient means, the grids are kept in yielding electrical contact with each other, and will thereby maintain the electrical circuit. The rods, 4, are supported by the framework 15, or any other suitable means.

I do not desire to limit myself to the particular construction and arrangement of parts as herein shown, but aim to cover in the appended claims all modifications which are within the scope of my invention.

What I claim as new and desire to secure by Letters Patent of the United States, is:

1. The combination with a resistance unit comprising a plurality of sections, each section comprising a plurality of grids, arranged electrically to contact with each other, means to support the grids, a resilient means positioned thereon to maintain the grids in yielding contact with each other, and means arranged to separate the said sections, and still maintain the effectiveness of the springs to the grids in both sections.

2. An electrical resistance comprising a plurality of conducting grids, rods for supporting said grids at each end thereof, a coil spring on each rod adapted to force the grids into contact with each other, and means for varying the tension of said springs independently of each other.

In testimony whereof, I have signed my name to this specification in the presence of two subscribing witnesses.

DAVID L. LINDQUIST.

Witnesses:
  CHARLES B. MANVILLE,
  WALTER C. STRANG.

Copies of this patent may be obtained for five cents each, by addressing the "Commissioner of Patents, Washington, D. C."